UNITED STATES PATENT OFFICE.

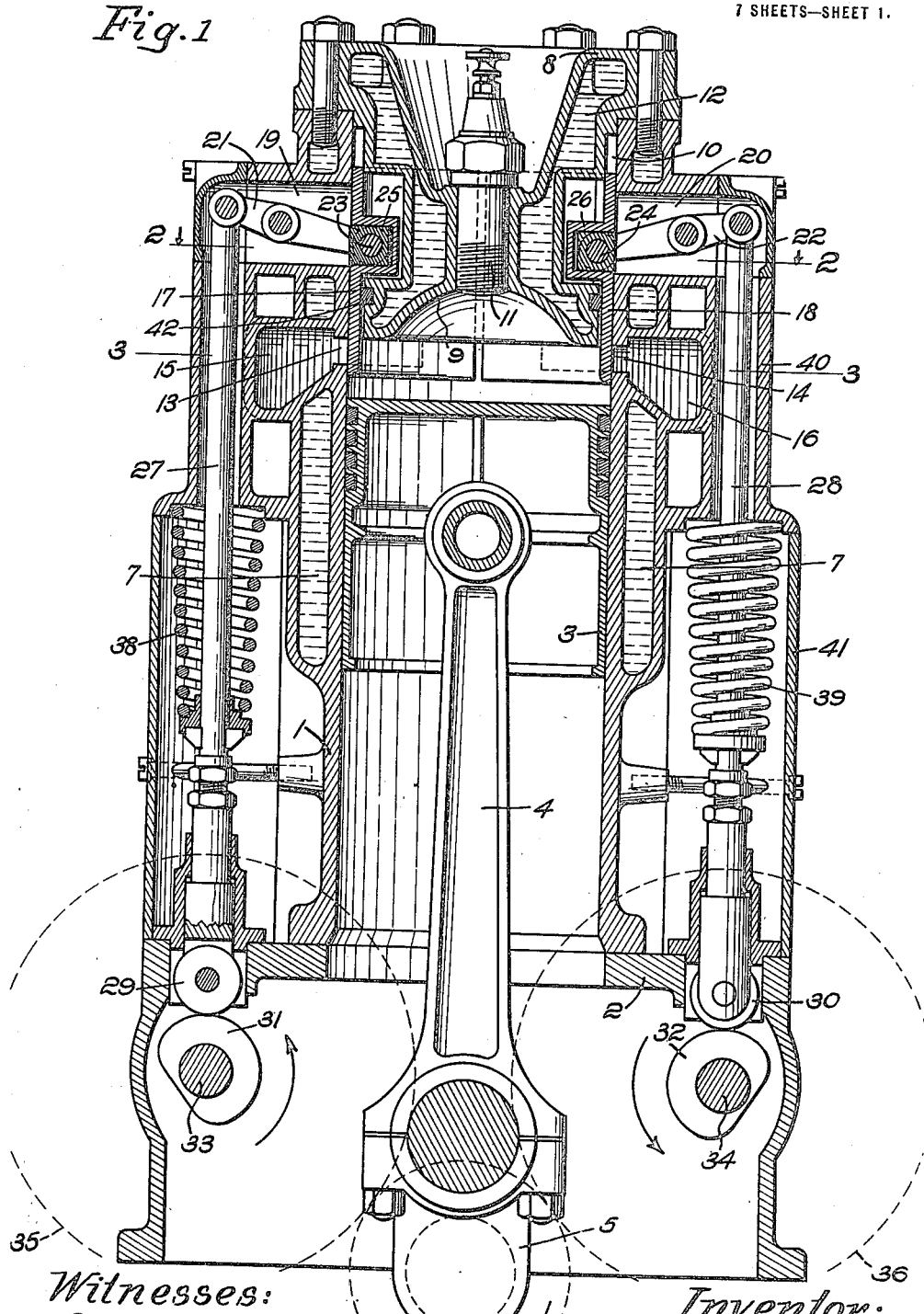

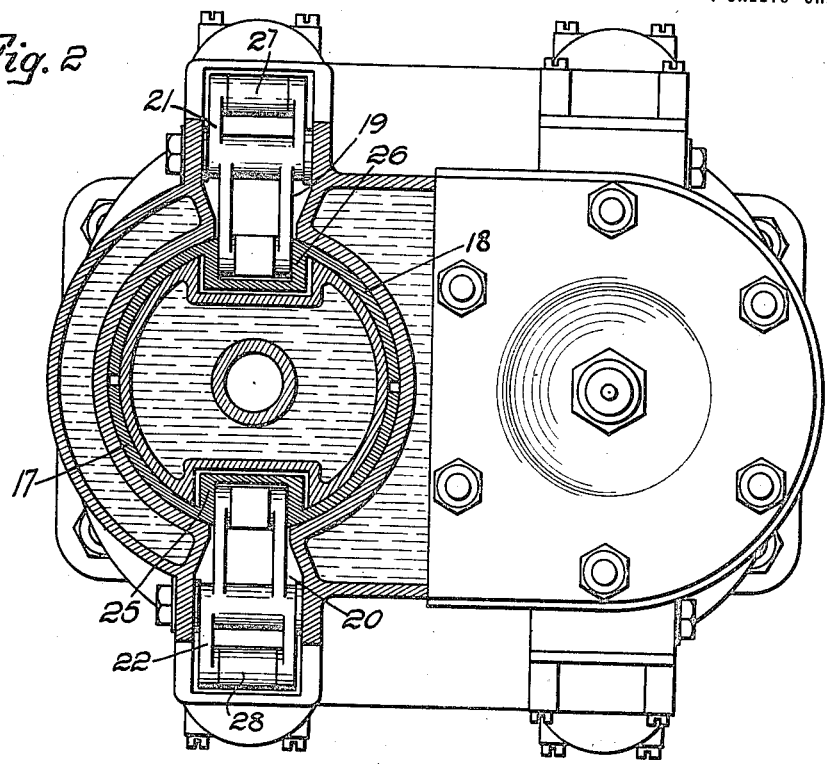
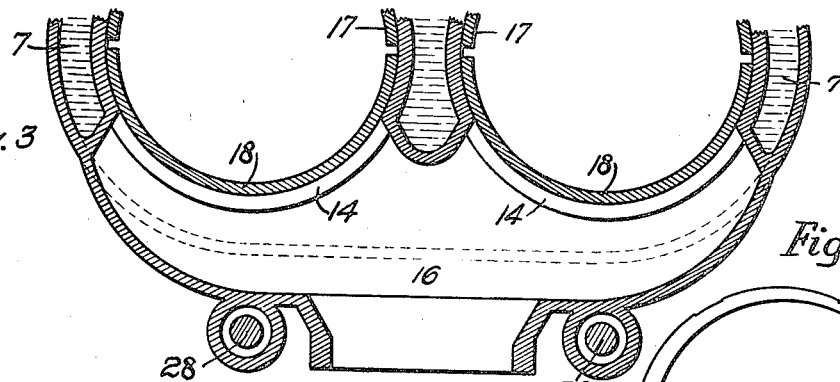
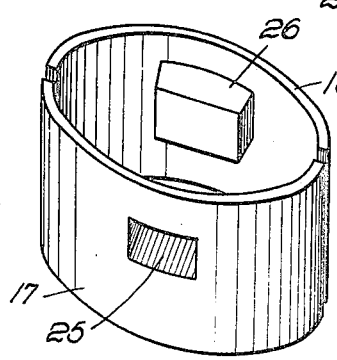
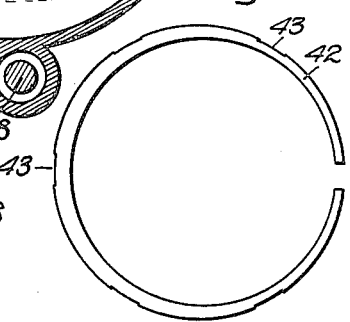

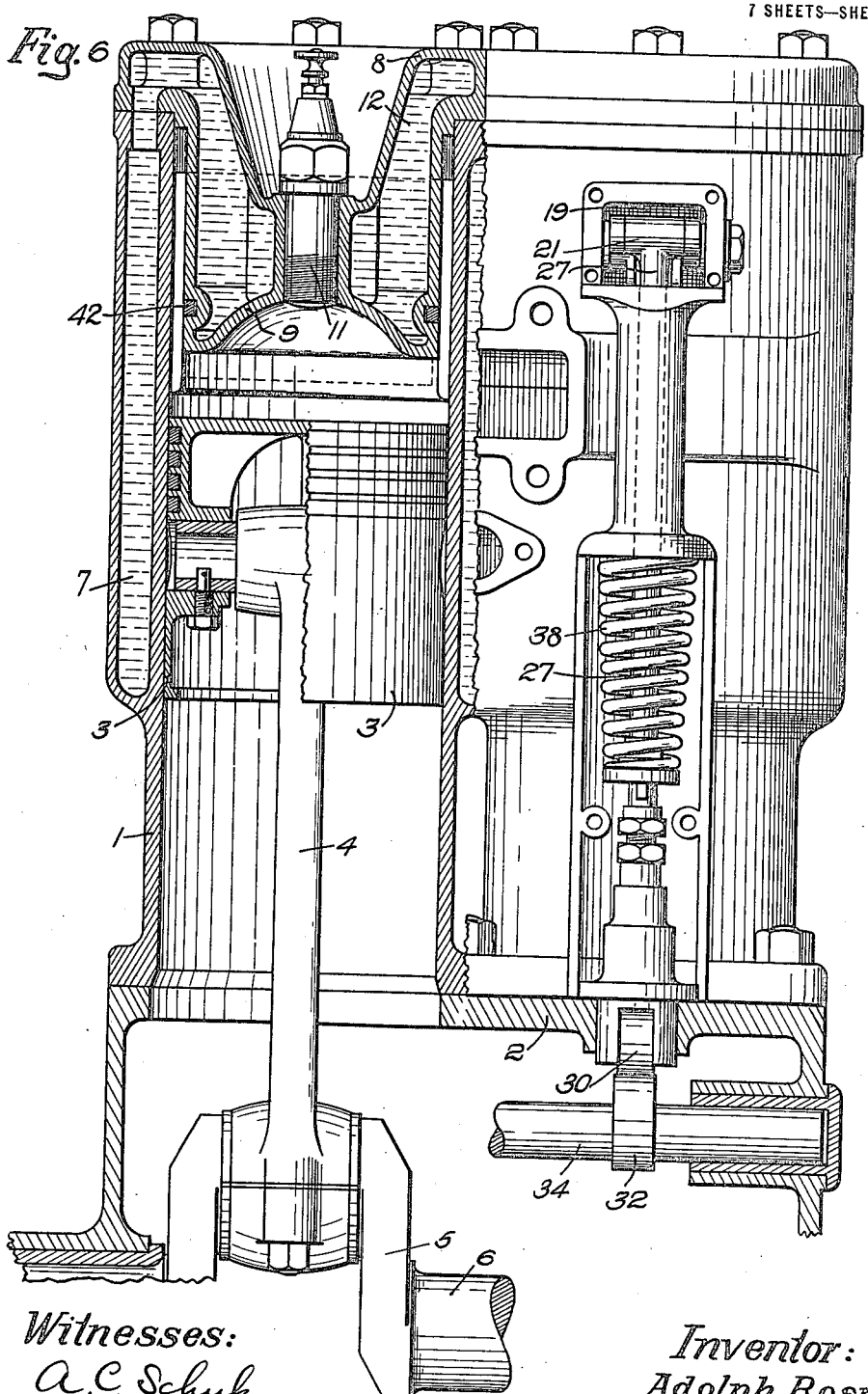

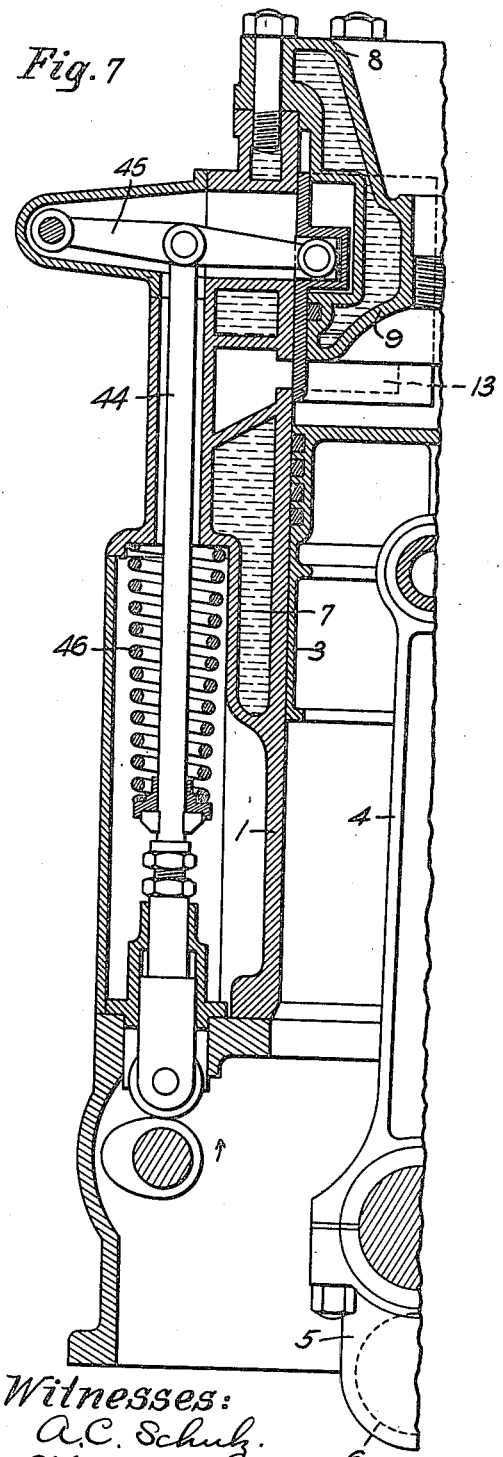
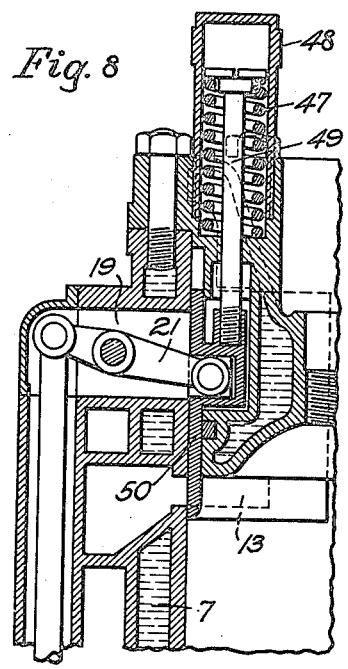
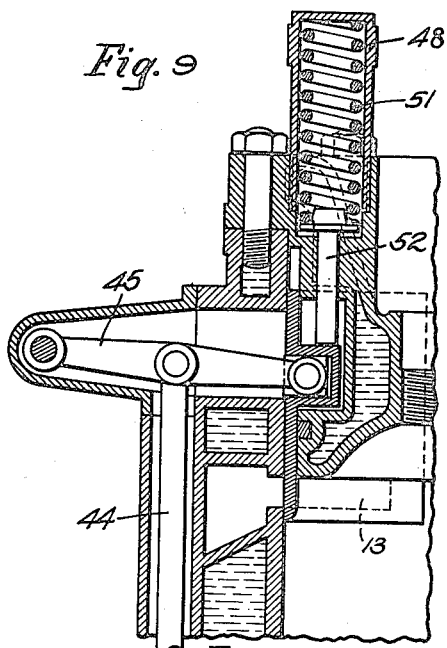

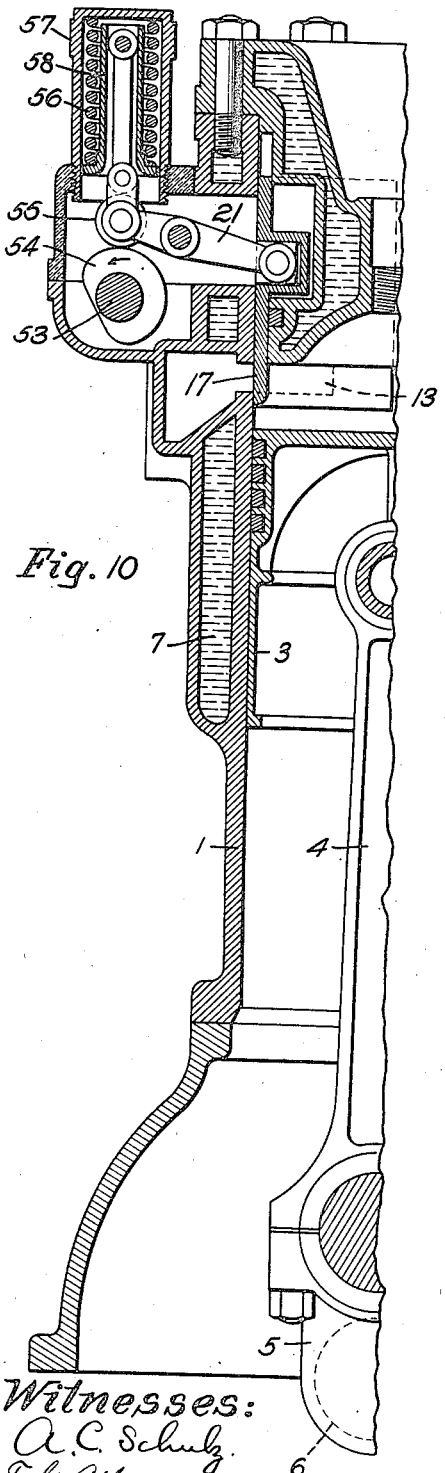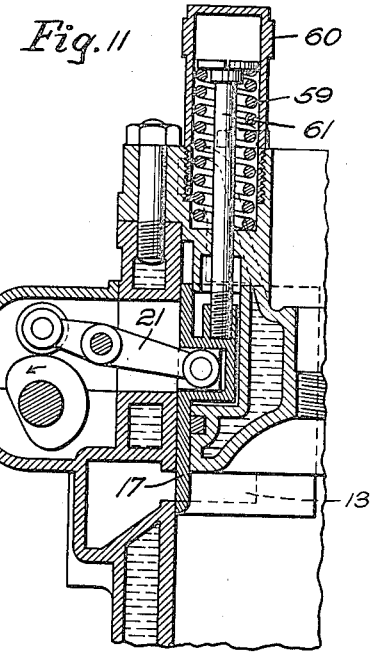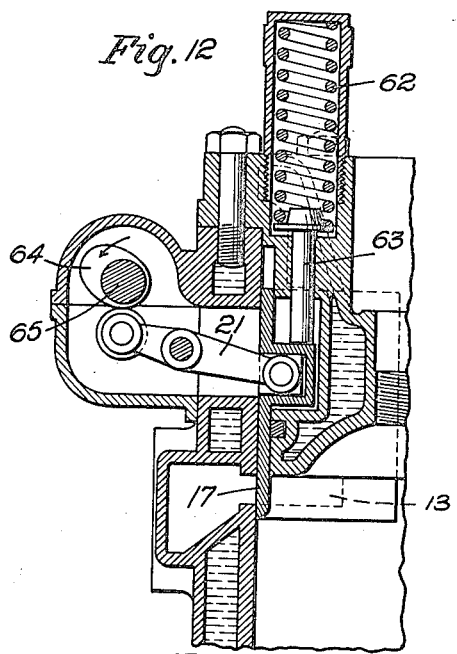

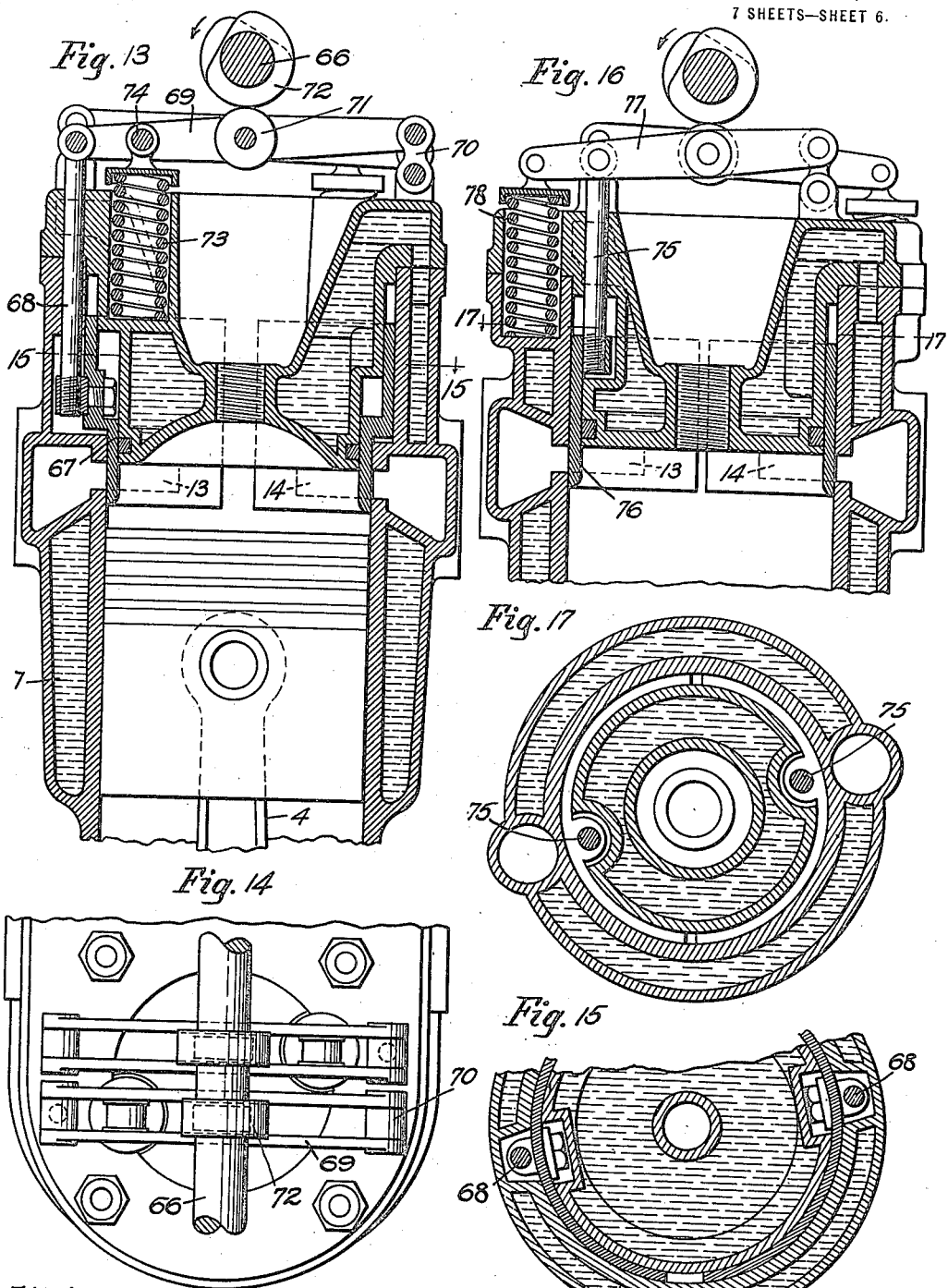

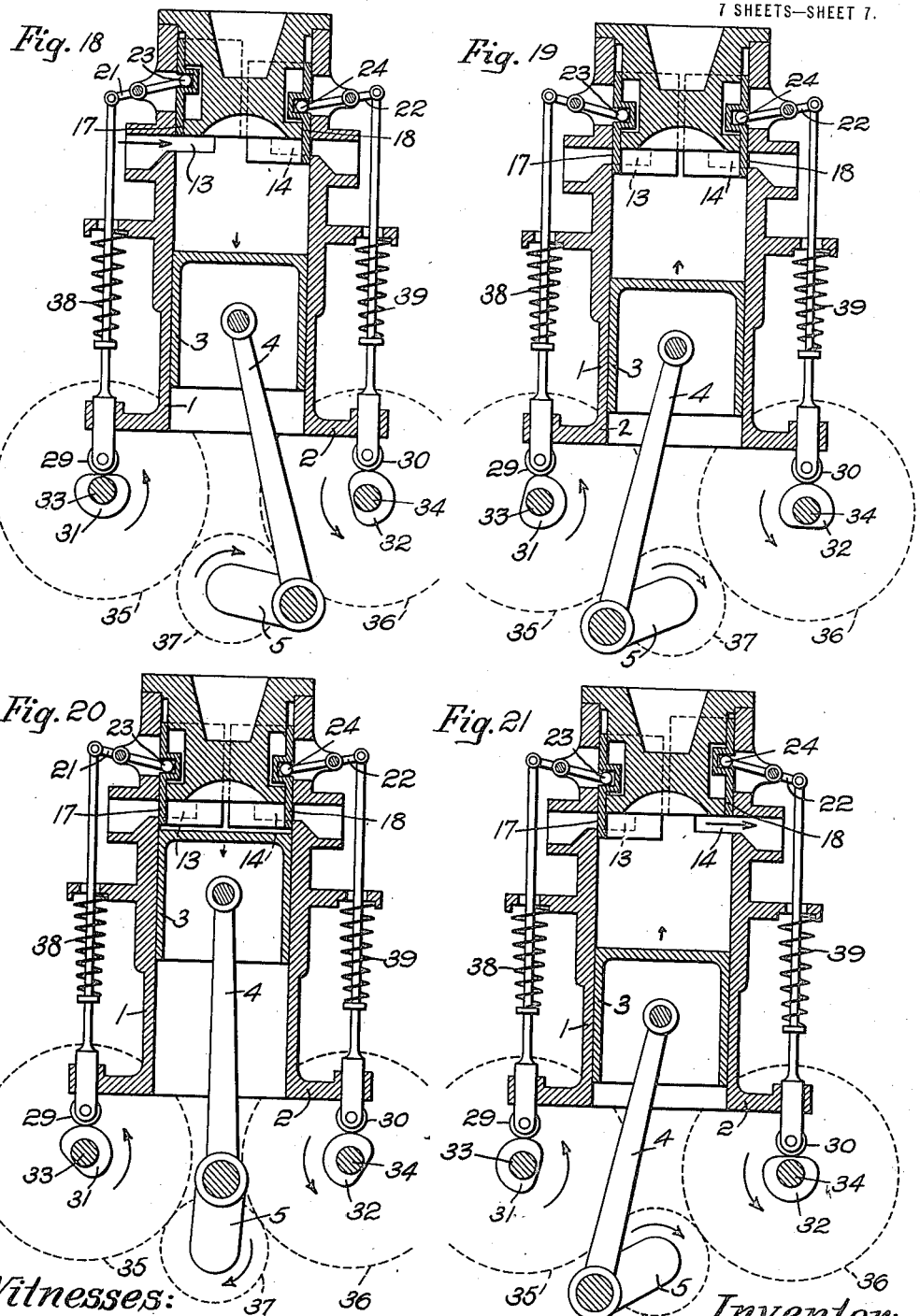

ADOLPH ROSNER, OF BRIDGEPORT, CONNECTICUT, ASSIGNOR TO THE "LOCOMOBILE" COMPANY OF AMERICA, OF NEW YORK, N. Y., A CORPORATION OF WEST VIRGINIA.

INTERNAL-COMBUSTION ENGINE 1,215,869.  Specification of Letters Patent.  Patented Feb. 13, 1917.

Application filed May 1, 1911. Serial No. 624,324.

*To all whom it may concern:*

Be it known that I, ADOLPH ROSNER, a subject of the Emperor of Austria-Hungary, and a resident of Bridgeport, county of Fairfield, State of Connecticut, (whose post-office address is 1166 Kossuth street, Bridgeport, Connecticut), have invented an Improvement in Internal-Combustion Engines, of which the following description, in connection with the accompanying drawings, is a specification, like characters on the drawings representing like parts.

This invention relates to internal combustion engines and particularly to the means for controlling the admission of fuel to the cylinder and the exhaust of the waste gases therefrom.

In carrying out my invention I preferably make use of slide valves. The valves as herein disclosed, however, are so designed and disposed that an extremely high degree of compression can be readily attained while, at the same time, the valves are simple in construction and operation and are free from the difficulties of lubrication, overheating and other troubles to which valves of this class have heretofore been subjected.

The invention will be best understood by reference to the following description when taken in connection with the accompanying illustration of one specific embodiment thereof, while its scope will be more particularly pointed out in the appended claims.

In the drawings:

Figure 1 is a transverse sectional elevation taken through one cylinder of a double-cylinder engine equipped with one form of my invention;

Fig. 2 is a plan partly in section taken on the line 2—2 in Fig. 1;

Fig. 3 is a section in plan partly broken away taken on the line 3—3 in Fig. 1;

Fig. 4 is a perspective view showing the pair of arc-shaped slide valve plates;

Fig. 5 is a plan view showing the supplemental spring ring for assisting in seating the valves;

Fig. 6 is a side elevation of the engine partly in section taken on a plane at right angles to the plane of the section shown in Fig. 1;

Fig. 7 is a sectional elevation similar to Fig. 1 showing a modified construction;

Figs. 8, 9, 10, 11, 12 and 13 show further modifications;

Fig. 14 is a plan view of the engine shown in Fig. 13 partly broken away;

Fig. 15 is a section in plan on the line 15—15 in Fig. 13;

Fig. 16 shows in sectional elevation a further modification;

Fig. 17 is a section in plan on the line 17—17 in Fig. 16; and

Figs. 18, 19, 20 and 21 are sectional elevations partly diagrammatic showing the piston and valves in different positions.

Referring to the drawings and particularly to the embodiment of the invention shown in Fig. 1 the engine there illustrated is provided with a fixed main cylinder 1, supported upon the crank casing 2. A working piston 3 is provided being connected by the connecting rod 4 to the crank 5 and crank shaft 6. The working space of the cylinder, or that through which the piston travels, is surrounded by the water jacket 7 and the piston slides in direct contact with the water jacketed walls of the fixed cylinder. The rear end of the cylinder is closed by the cylinder head 8 which is bolted or otherwise fixedly secured to the top or end of the cylinder forming a gas tight joint and a gas tight closure for the end of the cylinder. The cylinder head has the portion 9 which projects into the rear end of the cylinder, the projecting portion being of lesser diameter than the diameter of the cylinder providing thereat an annular space 10 between the cylinder and the reëntrant walls of the head. The cylinder head has the centrally arranged spark plug 11 and is provided also with the water jacket 12.

At the rear of the cylinder, beyond the working space thereof, and in close approximation to the projecting portion of the cylinder head are provided the oppositely disposed admission and exhaust ports 13 and 14, respectively. While these ports might be otherwise located, they are preferably formed directly in the walls of the cylinder bore itself and as shown in Fig. 3 extend each part way around the cylinder, the admission ports of each pair of cylinders communicating with a common admission space 15 and supply pipe (the latter not shown) and the exhaust ports with a common exhaust space 16 and exhaust pipe (not shown).

In the described embodiment of the invention the ports 14 and 15 are controlled by independently movable slide valves 17 and 18, respectively. While the valves might consist of flat plates or have other than a curvilinear shape, for convenience in construction as well as more efficient operation, each valve preferably comprises an arc-shaped but non-cylindrical segmental plate having a curvature corresponding to the curvature of the cylinder bore so that it is adapted to seat thereagainst.

These valve plates or slides are moved independently up and down by means to be fully described so that their ends which in their lowermost positions terminate short of the piston and the working space of the cylinder, are alternately projected each over its respective port to close the same and withdrawn therefrom to open the port. The valve sides at their inner faces are exposed to the pressure of the gas contained in the cylinder so that they are automatically seated during the compression and working strokes of the piston, the high pressure exerted radially outward against the valves, holding them effectively each against its seat, preventing all leakage at the ports.

The inner faces of the slides are not required to fit closely or seat against the projecting walls of the cylinder head. On the contrary, there is preferably provided (as shown in Fig. 1) a slight clearance between the cylinder head and the slides so as to permit free access of pressure from the cylinder space to the back or inner sides of the valves above the explosion space of the engine. The valves being automatically seated by the pressure within the cylinder space, the free access of pressure to the annular space at the back of the valves is preferable rather than harmful and the valves as shown may be less than semi-cylindrical with their longitudinal edges out of contact and separated by a space of any desired width so long as sufficient lap is provided to cover the ports.

To move the valves independently and in properly timed relation, actuating devices are provided having connection with the valves through openings 19 and 20 formed in the cylinder walls and in the seat over which the valves slide. In the openings 19 and 20 there are pivoted the actuating levers 21 and 22, respectively, which are connected to the valves at their outer sides or faces by means of the trunnions 23 and 24, respectively, seated in the depressions or pockets 25 and 26 (see Fig. 4) formed in the valves.

The openings 19 and 20 being formed in the cylinder and the valves being pressed automatically thereagainst by the pressure within the cylinder space, all leakage is prevented through the openings in the same manner as it is through the ports 13 and 14 when the latter are closed.

To actuate the valves the levers 21 and 22 are jointed respectively to the push rods 27 and 28, the latter being connected at their lower ends with the cam rolls 29 and 30 engaging respectively the actuating cams 31 and 32 on the cam shafts 33 and 34. These cam shafts are driven through gears 35 and 36, meshing with the pinion 37 on the crank shaft at one-half the speed of the crank shaft. Each cam is provided with one depression which, when brought beneath the cam roll, permits its respective valve to move back into the annular space and open its respective port under the pressure of a valve opening spring, such opening movement, therefore, taking place once for each two double strokes of the piston.

It will be observed that the cam is effective for positively closing and maintaining the valve closed during compression and firing, while spring pressure is utilized for opening the valve at the appropriate time. The springs herein are provided at 38 and 39 which hold the cam rolls of the respective push rods against the edges of the cams 31 and 32. The push rods and associated parts are housed in by the protecting casings 40 and 41.

Inasmuch as the admission valve is not opened until after the piston is started on its admission stroke and there is momentarily a slight suction created, there is preferably provided supplemental means for holding each valve, and particularly the exhaust valve, against its seat in spite of such suction, as well as to resist tendencies at any other time for the said valves to lift from their seats. Such supplemental means herein comprises a spring ring 42 (see Figs. 1 and 5) seated in a recess in the projecting portion of the cylinder head so as to bear against the inner sides of the slides. As shown in Fig. 5 such ring does not and is not intended to act as a packing ring but merely as a valve seating spring, the ring being exteriorly grooved at 43 as shown in Fig. 5 to permit the free passage of pressure fluid from one side to the other thereof.

Referring to Figs. 18 to 21, inclusive, the operation of the valves will be readily apparent. In Fig. 18 the piston is shown during its admission or suction stroke, the admission valve 17 having been retracted into the annular space and having opened the admission port 13 to the cylinder. The exhaust valve 18 has been previously closed and is still maintained closed by its cam 32.

The conditions which pertain during the compression stroke are represented in Fig. 19. The piston is there shown as having started on the compression stroke, the admission valve 17 having been previously closed by its cam 31 and the exhaust valve being still maintained closed by its cam 32. Under these conditions the increasing compression within the cylinder increasingly presses the valves against their respective seats so that as the compression increases, so also does the resistance to leakage at and about the valves.

In Fig. 20, the conditions at the commencement of the working stroke are represented, the piston having started on its second forward movement and both the valves being still maintained closed by their respective cams.

In Fig. 21 the piston is shown as having completed its working stroke and as starting on the return or exhaust stroke, the exhaust valve 18 having been permitted to open by its cam at the commencement of the stroke.

The valves may be given a very short stroke, herein the equivalent only of the port opening plus the necessary lap, and through the use of the cams as actuating agents may be moved each at such an appropriate time as gives the most effectively timed port opening for admission and exhaust. Thus, during suction stroke, the admission valve can be opened almost instantly after the commencement of the admission stroke and remain open until a little after the completion of the stroke. On the other hand, the exhaust valve may be opened near the very close of the working stroke and can be kept open until the completion of the exhaust stroke of the piston. By modifying the shape of the cams the precise timing of the valves can be independently varied as may be desired and preferably I so set the cams that the exhaust valve is not closed until a few degrees after the completion of the exhaust stroke of the piston and not until the admission valve has started to open, so that there is a slight interval during which both valves are opened permitting a momentary scavenging action.

The opening and closing movements of the valves in each case are effected very rapidly by means of the cams. This adds materially to the effectiveness of the admission, compression, working, and exhaust strokes.

The cam-operated movement of the valves and the short travel required produces a minimum of wear. It will be observed moreover that the valves are only in motion when the internal pressure is slight, periods of compression and firing occurring when the valves are stationary. This not only reduces the frictional wear of the valves but also the power required to move them and provides conditions which assist in preventing leakage.

The valves as herein shown are preferably located at the rear of the working space of the cylinder and out of contact with the piston, this placing them out of the direct path of heat conduction or dispersion which takes place from the working cylinder space through the cylinder walls to the water jacket. The slide valves therefore are not only themselves out of the direct path of heat which must be dissipated through the cylinder walls and that intense heat which tends to interfere with their effective operation is avoided, but the cooling of the cylinder is much more effectively carried out where the heat does not have to traverse the valves themselves interposed between the piston and the cylinder walls.

While the access of pressure fluid to the annular space 10 is permitted to hold the valves seated, their location with the major portion of each within the annular space between the cylinder head and the cylinder, causes them to be shielded to a large extent by the projecting cylinder walls from the intense heat of the combustion chamber during the working stroke, the only portion of the valves which are exposed to the intense heat of combustion being the short projecting ends which cover the ports.

While the valves might be arranged upon seats not constituting a part of the cylinder bore, preferably, as herein shown, they are seated in a continuation of the cylinder bore, being, however, in a non-concentric or non-overlapping relation to the piston. Furthermore, while it is not essential for the operation of the valves that the cylinder head have the projecting portion 9, by employing such portion it permits the introduction of the water jacket into the end of the cylinder and the interposition of a heat shield between the major portions of the valves and the explosion chamber.

It will thus be seen that the slide valves are reduced substantially to those simple structural elements required for performing their essential functions and offer no interference with the cooling of the cylinder and the working space thereof and actuated by very simple but effective mechanisms.

In Fig. 7 there is shown a modified form of the engine illustrated in Fig. 1, the push rod 44 being connected to the valve actuating lever 45 at a point intermediate the lever fulcrum and the valve so that the cam herein acts positively to open the valve, the spring 46 being relied upon to close the same.

In Fig. 8 there is shown a construction similar to that shown in Fig. 1, there being employed, however, an additional spring 47 at the top of the cylinder head. This spring is seated in a pocket formed in the cylinder head and inclosed by the cap 48, the spring tending to lift the rod 49, the lower end of which passes through the cylinder head and is threaded into the valve 50. This tends to assist the main spring 38 (Fig. 1) in holding the cam roll against the cam and eliminates all lost motion in the cams and joints between the spring 38 and the cam. In this construction the cam positively closes the valve while the springs 38 and 47 open the same under elastic pressure.

In Fig. 9 there is shown a spring 51 similarly located but intended to assist a main spring such as the spring 46 shown in Fig. 7 which is employed for closing the valve. In this construction the spring tends to press downward upon the push rod 52 engaging the valve, and, in conjunction with the spring 46, to depress the same into its closed position, the cam being positively relied upon to open the valve.

In Fig. 10 the valve 17 and the valve actuating lever 21 are shown arranged the same as in Fig. 1, but a cam shaft 53 is employed located at the side of the cylinder and near the top thereof, so that the cam 54 acts directly upon the cam roll 55 carried by the actuating lever 21 itself. This avoids the necessity of the push rods, the valve being opened herein by a spring 56 contained within the cap 57 and pressing downwardly upon the flanged sleeve 58 operatively connected to the lever 21.

In Fig. 11 a similar construction is shown, the opening spring 59, however, being seated in a pocket of the cylinder head inclosed by the cap 60 and tending to lift the rod 61, the lower end of which projects through the cylinder head and is secured to the valve.

In Fig. 12 an arrangement similar to that in Fig. 11 is shown, the spring 62, however, being relied upon to close the valve by pressing down upon the valve pusher rod 63, the cam 64 and cam shaft 65 herein being located above the cam roll so that the cam serves positively to open the valve.

In Fig. 13 a further modification is shown wherein the two cylinders are operated from a single cam shaft 66 placed above the cylinder head. The two slides are operated by connections similarly but reversely arranged. Taking for example the admission slide 67, this has secured to the outer side thereof the actuating rod 68, the upper end of which is pivoted to the lever 69. The latter has its rear end pivoted to the link 70 and carries the cam roll 71 engaging the cam 72. The spring 73 seated in the cylinder head is operatively connected to the lever 69 at 74 tending to lift the lever to hold the cam roll to the cam and open the valve when the cam permits. In the form shown in Fig. 13, the slides have two bearing seats, one in the cylinder bore and one in the larger diameter beyond the cylinder bore.

In Fig. 16 there is shown a modification wherein the bearing seat for the slides are the same diameter throughout as the cylinder bore. Herein the actuating rod 75 for the slide 76 is secured to the same between the reëntrant walls of the head and the portion of the cylinder against which the valve seats, the rod passing through the head and connected to the actuating lever 77. The spring 78 tending to lift the lever and open the valve is then located in a pocket formed in the cylinder outside of the actuating rod. Obviously the method of actuating the slide shown in Figs. 13 and 16 can be utilized while employing the springs to close the valves instead of opening the same.

It will be understood that the terms "front," "rear," "top" and "bottom" as applied to the engine and its cylinder are merely terms of description applied to the specific drawings herein annexed to facilitate a more ready understanding of them, and have no significance as applied to the generic principles of my invention, various embodiments of which may be made wherein the relation of the parts thus referred to may be reversed or variously altered.

While I have herein shown and described for purposes of illustration one specific form of the invention, it is to be understood that the latter is not limited to the precise construction of features disclosed nor to the form or relative arrangements of parts nor to the particular type of engine described, but that extensive modifications may be made in the illustrated embodiment of the invention without departing from the spirit thereof.

Claims:

1. In an internal combustion engine the combination with a fixed cylinder having a bore of uniform diameter, oppositely disposed admission and exhaust ports at the rear of the working space, a piston, and a pair of independently movable and oppositely disposed non-cylindrical arc-shaped slide valves seated against the interior cylinder walls beyond the rearward limit of piston travel and means for independently moving said valves for opening and closing said ports.

2. In an internal combustion engine, the combination with a cylinder, of a piston, said cylinder having admission and exhaust ports in the explosion chamber, independent slide valve plates arranged to open and close said ports and located beyond the rearward limit of piston travel, said valve plates being exposed to the pressure of the working cylinder space and means for independently moving said valve plates.

3. In an internal combustion engine, the combination with a cylinder, of a piston, said cylinder having admission and exhaust ports at the rear of the cylinder chamber, independent arc-shaped segmental valve plates arranged to open and close said ports and located beyond the rearward limit of piston travel, said valve plates being exposed to the pressure of the working cylinder space, and means for independently moving said valve plates.

4. In an internal combustion engine, the combination with a cylinder, a piston, said cylinder having a port, a slide valve plate seated upon the wall of said cylinder and controlling said port, said valve being automatically seated by the pressure of the gas contained within the cylinder space, and means for moving said valve plate, said wall having an opening covered by the valve and separate from the port, through which opening the valve moving means passes.

5. An internal combustion engine comprising a cylinder having a water jacketed working space, a water jacketed cylinder head, said cylinder having admission and exhaust ports and independently movable arc-shaped valve plates automatically seated by exposure to the pressure of the gas within the cylinder, said plates working between the walls of the cylinder and the cylinder head and out of the direct path of heat dispersion from the working space to the water jacket.

6. An internal combustion engine comprising a fixed cylinder, a piston in direct contact with the walls thereof, a cylinder head forming a gas tight closure for the rear end of the cylinder, said cylinder having ports and means for controlling said ports comprising a pair of arc-shaped slide valves automatically seated under the pressure of the gas contained in the cylinder chamber and means for independently moving said valves comprising actuating means connecting the exterior of each valve and working through an opening in the wall on which the valve seats.

7. In an internal combustion engine, the combination with a cylinder of a cylinder head having a portion projecting into the cylinder to leave an annular space between the same and the walls of the cylinder, a piston, said cylinder having a port and an arc-shaped slide valve working in the said annular space and having its major portion contained therein and adapted to be alternately projected therefrom and retracted to control said port.

8. In an internal combustion engine the combination with a cylinder, a cylinder head forming a gas tight closure for the end of said cylinder but having a portion projecting within the same to provide an annular space, said cylinder being provided with ports, a pair of arc-shaped slide valves working in said annular space and out of contact with the piston and at the rear thereof to control said ports, and means for independently moving said valves.

9. In an internal combustion engine, the combination with a cylinder, a cylinder head having a portion projecting into the cylinder to provide an annular space, a pair of independent arc-shaped slide valves working in said annular space, said valves being exposed on their inner sides to the pressure of the gas contained in the cylinder and thereby automatically seated, said valves being outside the direct path of heat dispersion from the working space of the cylinder to the cylinder walls.

10. In an internal combustion engine, the combination with a cylinder of a cylinder head having a portion projecting into the cylinder leaving an annular space between the same and the cylinder walls, said cylinder being provided with ports, a pair of independently movable arc-shaped slide valves working in said space adapted to control said ports, said valves being exposed to the pressure of the gas contained in the cylinder but shielded as to their major portions by the said projecting portion of the cylinder head from the intense heat of the combustion chamber, and means for moving said valves.

11. In an internal combustion engine, the combination with a cylinder having a firing space, the containing walls of said firing space being provided with a port, a slide valve plate seated on the interior of said containing walls to control said port, said valve being exposed to the pressure of the explosion space and thereby automatically seated, the portion of said wall upon which said valve is seated having an opening therein separate from the port and an actuating connection for moving said valve in said opening.

12. In an internal combustion engine, the combination with a fixed cylinder having oppositely disposed admission and exhaust ports at the rear of the working space, the working space of the cylinder being surrounded by a water jacket, a piston working in direct contact with the water jacketed walls of said cylinder, a cylinder head rigidly clamped to the fixed cylinder to form a gas tight joint therewith but having a water-jacketed portion projecting into the rear portion of the cylinder chamber providing an annular space thereat, a pair of independently movable and oppositely disposed arc-shaped slide valves seated against the interior cylinder walls and working in the said annular space, and means for moving said valves independently.

13. In an internal combustion engine, the combination with a fixed cylinder having oppositely disposed admission and exhaust ports at the rear of the working space, a piston working in direct contact with the walls of said cylinder, a cylinder head rigidly clamped to the fixed cylinder to form a gas tight joint therewith but having a portion projecting into the cylinder chamber and providing an annular space thereat, and oppositely disposed slide valves seated against the inner walls of the cylinder space by the pressure of the gas contained therein and working in the said annular space, and means for independently moving said valves.

14. In an internal combustion engine, the combination with a fixed cylinder having a port at the rear of the working space, the working space of the cylinder being surrounded by a water jacket, a piston working in direct contact with the water jacketed walls of said cylinder, an arc-shaped slide valve seated against the interior cylinder walls and adapted to control said port, said valve being out of the direct path of heat dispersion from the working cylinder space to the water jacket and means for moving said valve to control said port.

15. In an internal combustion engine, the combination with a fixed cylinder having admission and exhaust ports at the rear of the working space, the working space of the cylinder being surrounded by a water jacket, a piston working in direct contact with the water jacketed cylinder, a cylinder head rigidly clamped to the cylinder to form a gas tight joint therewith, independently movable arc-shaped slide valves seated against the interior cylinder walls and having their inner faces exposed to the working pressure of the engine and thereby maintained tight each against its seat during the compression and working stroke of the piston, said valves being outside of the direct path of heat dispersion from the working space of the cylinder to the water jacket.

16. In an internal combustion engine, the combination with a fixed cylinder having oppositely disposed admission and exhaust ports at the rear of the working space, the working space of the cylinder being surrounded by a water jacket, a piston working in direct contact with the water jacketed walls of said cylinder, a cylinder head rigidly clamped to the fixed cylinder to form a gas tight joint therewith but having a water-jacketed portion projecting into the rear end of the cylinder chamber providing an annular space between the walls of the head and the walls of the cylinder, said head projecting into said cylinder into close approximation to said ports, a pair of independently movable and oppositely disposed arc-shaped slide valves seated against the interior cylinder walls and working in the annular space, said valves being at the rear of the limits of piston travel and outside of the direct path of heat dispersion from the working space through the cylinder walls, means for moving said valves independently to alternately project each one over its respective port and withdraw it into said annular space thereby to provide for the admission, compression, working and exhaust strokes of the piston, said moving means including for each valve a pivoted lever, the inner faces of said slides being exposed to the working pressure of the engine and thereby maintained tight each against its seat during the compression and working stroke of the piston.

17. In an internal combustion engine, the combination with a fixed cylinder having oppositely disposed admission and exhaust ports at the rear of the working space, the working space of the cylinder being surrounded by a water jacket, a piston working in direct contact with the water-jacketed walls of said cylinder, a cylinder head rigidly clamped to the fixed cylinder to form a gas tight joint therewith but having a water-jacketed portion projecting into the rear portion of the cylinder chamber providing an annular space between the walls of the head and the walls of the cylinder, said head projecting into said cylinder into close approximation to said ports, a pair of independently movable and oppositely disposed arc-shaped slide valves seated against the interior cylinder walls and working in the said annular space, said valves being at the rear of the limits of piston travel and outside of the direct path of heat dispersion from the working space through the cylinder walls, means for moving said valves independently to alternately project each one over its respective port and withdraw it into said annular space thereby to provide for the admission, compression, working and exhaust strokes of the piston, said moving means including for each valve a pivoted lever, an actuating cam for positively closing the valve, a spring for opening the same and connections between said parts and said valve at the outer side of the latter, the inner faces of said slides being exposed to the working pressure of the engine and thereby maintained tight each against its seat during the compression and working stroke of the piston and supplementary means for holding each valve against its seat comprising a spring ring interposed between the inner side of the slide and the projecting walls of the cylinder head.

18. An internal combustion engine comprising a cylinder having oppositely disposed admission and exhaust ports near the rear of the working space, a pair of independently movable but oppositely disposed arc-shaped slide valves seated against the interior cylinder walls beyond the rearward limit of piston travel and means independently to move said valves to control said admission and exhaust ports respectively, said valves being automatically seated by exposure to the cylinder pressure.

19. An internal combustion engine comprising a cylinder having a cylinder head extending into the cylinder and forming an annular space between the same and the walls of the cylinder, oppositely disposed admission and exhaust ports in the cylinder walls between the head and the working space of the cylinder, a pair of independently movable but oppositely disposed arc-shaped slide valves seated against the interior cylinder walls between said annular space and behind the working space of the cylinder, said valves being automatically seated by exposure to cylinder pressure and means to move said valves to control said admission and exhaust ports.

20. In an internal combustion engine, the combination with a fixed cylinder having oppositely disposed admission and exhaust ports at the rear of the working space, a piston working in direct contact with the walls of said cylinder, a cylinder head having a portion projecting into the cylinder chamber and providing an annular space thereat communicating with said working space, oppositely disposed arc-shaped slide valves seated against the inner walls of the cylinder space by the pressure contained therein and working in said annular space, and means for independently moving said valves to project the same from said annular space and cover the said ports.

21. An internal combustion engine having a cylinder comprising oppositely disposed admission and exhaust ports near the rear of the working space, a pair of independently movable but oppositely disposed arc-shaped slide valves seated against the interior cylinder walls but beyond the rearward limit of piston travel, said valves being automatically seated by exposure to cylinder pressure, and means independently to move said valves to control said admission and exhaust ports, said means passing through openings in the walls of the cylinder covered by said valves.

22. An internal combustion engine comprising a cylinder having a cylinder head extending into the same and forming an annular space between the walls of the cylinder and the walls of the head, oppositely disposed admission and exhaust ports between the cylinder head and the working space, a pair of oppositely disposed slide valves automatically seated by exposure to the cylinder pressure against the interior cylinder walls and in said annular space, and means for moving said valves independently, said moving means passing through openings in the cylinder walls surrounding said annular space and said openings being covered by said valves.

23. In an internal combustion engine, the combination with a cylinder having oppositely disposed admission and exhaust ports near the rear of the working space, a pair of independently movable but oppositely disposed arc-shaped slide valves seated against the interior cylinder walls at the rear of the working space, said valves being automatically seated by exposure to the cylinder pressure, means for moving said valves each through an opening in the wall on which the valve seats.

24. In an internal combustion engine, the combination with a cylinder having oppositely disposed admission and exhaust ports near the rear of the working space, a pair of independently movable but oppositely disposed arc-shaped slide valves seated against the interior cylinder walls at the rear of the working space, said valves being automatically seated by exposure to the cylinder pressure, and means for moving said valves each through an opening in the wall on which the valve seats, the opening for the exhaust valve moving means being separate from the exhaust port, thereby to protect the valve moving means from the heated exhaust gases.

25. An internal combustion engine comprising a cylinder 1, a piston 3, said cylinder being provided with an inlet port 13 and an exhaust port 14, and independently movable arc-shaped slide valves 17 and 18 for controlling said ports and located at the rear of the path of reciprocation of the piston, said valves projecting into said cylinder and being maintained seated by exposure to the pressure therein, and means for reciprocating said valves.

In testimony whereof, I have signed my name to this specification, in the presence of two subscribing witnesses.

ADOLPH ROSNER.

Witnesses:
EVERETT S. EMERY,
THOMAS B. BOOTH.